US011941781B2

(12) United States Patent
Kang et al.

(10) Patent No.: US 11,941,781 B2
(45) Date of Patent: Mar. 26, 2024

(54) METHOD AND APPARATUS FOR RESTORING IMAGE

(71) Applicant: SAMSUNG ELECTRONICS CO., LTD., Suwon-si (KR)

(72) Inventors: Deokyoung Kang, Suwon-si (KR); Yang Ho Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 16/850,724

(22) Filed: Apr. 16, 2020

(65) Prior Publication Data

US 2021/0166352 A1 Jun. 3, 2021

(30) Foreign Application Priority Data

Nov. 28, 2019 (KR) .................. 10-2019-0155506

(51) Int. Cl.
*G06T 5/00* (2006.01)
*G06N 3/08* (2023.01)
*G06N 20/00* (2019.01)
*G06T 5/50* (2006.01)

(52) U.S. Cl.
CPC ............ *G06T 5/001* (2013.01); *G06N 3/08* (2013.01); *G06N 20/00* (2019.01); *G06T 5/006* (2013.01); *G06T 5/50* (2013.01); *G06T 2207/20081* (2013.01); *G06T 2207/20084* (2013.01)

(58) Field of Classification Search
CPC .......... G06T 5/00; G06T 5/001; G06T 5/002; G06T 5/003; G06T 5/005; G06T 5/006; G06T 5/50; G06T 2207/20081; G06T 2207/20084; G06T 2207/20076; G06N 20/00; G06N 20/10; G06N 20/20
USPC ............... 382/100, 254, 260, 266, 276–277, 382/155–159
See application file for complete search history.

(56) References Cited

U.S. PATENT DOCUMENTS

| 10,311,326 | B2   | 6/2019 | Amitay   |            |
|------------|------|--------|----------|------------|
| 2003/0002707 | A1* | 1/2003 | Reed     | G06T 3/4015 |
|            |      |        |          | 382/100    |
| 2006/0087572 | A1* | 4/2006 | Schroeder | G02B 5/201 |
|            |      |        |          | 348/E9.01  |
| 2006/0132916 | A1* | 6/2006 | Oikawa   | G02B 30/27 |
|            |      |        |          | 359/463    |

(Continued)

FOREIGN PATENT DOCUMENTS

| CN | 107679580 A    | 2/2018 |          |
|----|----------------|--------|----------|
| EP | 3182372 A1 *   | 6/2017 | G06T 5/50 |

(Continued)

OTHER PUBLICATIONS

Rosanne Liu et al. An intriguing failing of convolutional neural networks and the CoordConv solution 32nd Conference on Neural Information Processing Systems (NeurIPS 2018), (26 pages total).

(Continued)

*Primary Examiner* — Vikkram Bali
(74) *Attorney, Agent, or Firm* — Sughrue Mion, PLLC

(57) ABSTRACT

An image restoration method and apparatus are provided. The image restoration method includes acquiring a target image, and acquiring a restoration image of the target image from an image restoration model to which the target image and pixel position information of the target image are input.

20 Claims, 11 Drawing Sheets

(56) References Cited

U.S. PATENT DOCUMENTS

| | | | |
|---|---|---|---|
| 2009/0041378 A1* | 2/2009 | Yamaoka | G06T 5/006 |
| | | | 382/275 |
| 2011/0115793 A1* | 5/2011 | Grycewicz | H04N 5/349 |
| | | | 345/428 |
| 2015/0036014 A1* | 2/2015 | Lelescu | G06T 3/4007 |
| | | | 348/218.1 |
| 2019/0236368 A1 | 8/2019 | Murata et al. | |
| 2020/0090306 A1 | 3/2020 | Cho et al. | |
| 2020/0195873 A1* | 6/2020 | Yoon | H04N 5/2254 |
| 2020/0259979 A1* | 8/2020 | Kang | H04N 5/23229 |
| 2020/0321378 A1* | 10/2020 | Paiella | H01L 31/028 |

FOREIGN PATENT DOCUMENTS

| | | |
|---|---|---|
| JP | 3444612 B2 | 9/2003 |
| JP | 2019-087778 A | 6/2019 |

OTHER PUBLICATIONS

Xintao Wang et al. "ESRGAN: Enhanced Super-Resolution Generative Adversarial Networks" ECCVW, 2018, (16 pages total).

Facil, Jose M. et al., "CAM-Convs: Camera-Aware Multi-Scale Convolutions for Single-View Depth", 2019 IEEE/CVF Conference on Computer Vision and Pattern Recognition (CVPR), IEEE, Jun. 15, 2019, pp. 11818-11827, XP033687265. (10 pages total).

Zafeirouli, Kassiani et al., "Efficient, Lightweight, Coordinate-Based Network for Image Super Resolution", 2019 IEEE International Conference on Engineering, Technology and Innovation (ICE/ITMC), IEEE, Jun. 17, 2019, pp. 1-9, XP033594654. (9 pages total).

Wu, Sidong et al., "Artificial compound eye: a survey of the state-of-the-art", Artificial Intelligence Review, Sep. 1, 2016, vol. 48, No. 4, pp. 573-603, XP036355845. (31 pages total).

Communication dated Dec. 22, 2020 by the European Patent Office in counterpart European patent Application No. 20181976.0.

* cited by examiner

METHOD AND APPARATUS FOR RESTORING IMAGE

CROSS-REFERENCE TO RELATED APPLICATION

This application is based on and claims priority from Korean Patent Application No. 10-2019-0155506, filed on Nov. 28, 2019, in the Korean Intellectual Property Office, the disclosure of which is incorporated herein in its entirety by reference.

BACKGROUND

1. Field

One or more example embodiments provide methods and apparatuses that relate to a method and apparatus for restoring an image.

2. Description of the Related Art

Recently, due to developments in optical technologies and image processing technologies, image capturing apparatuses are utilized in a wide range of fields, for example, multimedia content field, a security field or a recognition field. For example, an image capturing apparatus may be installed in a mobile device, a camera, a vehicle or a computer, to capture an image, to recognize an object, or to acquire data used to control a device. However, since a portion with degradation is included in an image captured by the image capturing apparatus, a method of removing the degradation is required.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of the disclosure, there is provided an image restoration method comprising: acquiring a target image; and obtaining a restoration image of the target image from an image restoration model based on the target image and pixel position information of the target image.

The pixel position information may comprise images representing pixel positions in the target image based on two-dimensional (2D) coordinates.

The pixel position information may comprise a first image, in which, a first value changes in a first axis direction in Cartesian coordinates, and a second image, in which, a second value changes in a second axis direction perpendicular to the first axis direction, and the first image and the second image have a same resolution as the target image.

The pixel position information may comprise a third image, in which, a third value changes based on a distance from a reference point in polar coordinates, and a fourth image, in which, a fourth value changes based on an angle with respect to a reference line, and the third image and the fourth image have a same resolution as the target image.

The reference point may be a principle point of a lens that captures the target image, or a central point of the target image.

The pixel position information may comprise a first image, in which, a first value changes in a first axis direction in Cartesian coordinates, a second image, in which, a second value changes in a second axis direction perpendicular to the first axis direction, a third image, in which, a third value changes based on a distance from a reference point in polar coordinates, and a fourth image, in which, a fourth value changes based on an angle with respect to a reference line, and the first image, the second image, the third image and the fourth image have a same resolution as the target image.

The pixel position information and the target image may be concatenated with each other and input to the image restoration model.

The pixel position information and a pixel value of the target image may be input to a convolution layer of the image restoration model.

The target image may include different levels of degradation based on a pixel position.

The degradation may be caused by an aberration of a lens used to capture the target image.

The target image may comprise at least one low-resolution (LR) image with different levels of degradation based on a pixel position, and the restoration image is a high-resolution (HR) image in which the degradation is reduced with respect to the at least one LR image.

The image restoration model may be trained to output, in response to an input of a reference target image with different levels of degradation, a reference restoration image with a reduced degradation with respect to the reference target image based on a pixel position and reference pixel position information of the reference target image.

According to another aspect of the disclosure, there is provided a non-transitory computer-readable storage medium storing instructions that, when executed by a processor, cause the processor to perform the image restoration method.

According to another aspect of the disclosure, there is provided an image restoration method comprising: acquiring a plurality of target images captured based on a multi-lens array; and obtaining a restoration image of the plurality of target images from an image restoration model based on the plurality of target images and pixel position information of the plurality of target images.

The multi-lens array may comprise a plurality of lens elements, and the obtaining of the restoration image comprises obtaining the restoration image from the image restoration model based on position information of a lens element that captures each of the plurality of target images.

According to another aspect of the disclosure, there is provided an image restoration apparatus comprising: at least one processor is configured to: acquire a target image; and obtain a restoration image of the target image from an image restoration model based on the target image and pixel position information of the target image.

The pixel position information may comprise images representing pixel positions in the target image based on two-dimensional (2D) coordinates.

The pixel position information may comprise a first image, in which, a first value changes in a first axis direction in Cartesian coordinates, and a second image, in which, a second value changes in a second axis direction perpendicular to the first axis direction, and the first image and the second image have a same resolution as the target image.

The pixel position information may comprise a third image, in which, a third value changes based on a distance from a reference point in polar coordinates, and a fourth image, in which, a fourth value changes based on an angle with respect to a reference line, and the third image and the fourth image have a same resolution as the target image.

The pixel position information and the target image may be concatenated with each other and input to the image restoration model.

According to another aspect of the disclosure, there is provided a computer-implemented method of restoring an image in a trained neural network comprising: receiving a target image; receiving pixel position information; applying one or more transformations to the target image based on the pixel position information in one or more layers of the trained neural network; creating a restoration image based on the one or more transformations applied to the target image; and outputting the restoration image.

According to another aspect of the disclosure, there is provided an image restoration apparatus comprising: a memory storing one or more instructions; and at least one processor configured to execute the one or more instructions to: receive a target image; receive pixel position information; apply one or more transformations to the target image based on the pixel position information in one or more layers of a trained neural network; create a restoration image based on the one or more transformations applied to the target image; and output the restoration image.

BRIEF DESCRIPTION OF THE DRAWINGS

The above and/or other aspects will be more apparent by describing example embodiments with reference to the accompanying drawings, in which.

DETAILED DESCRIPTION

Figure 1A:
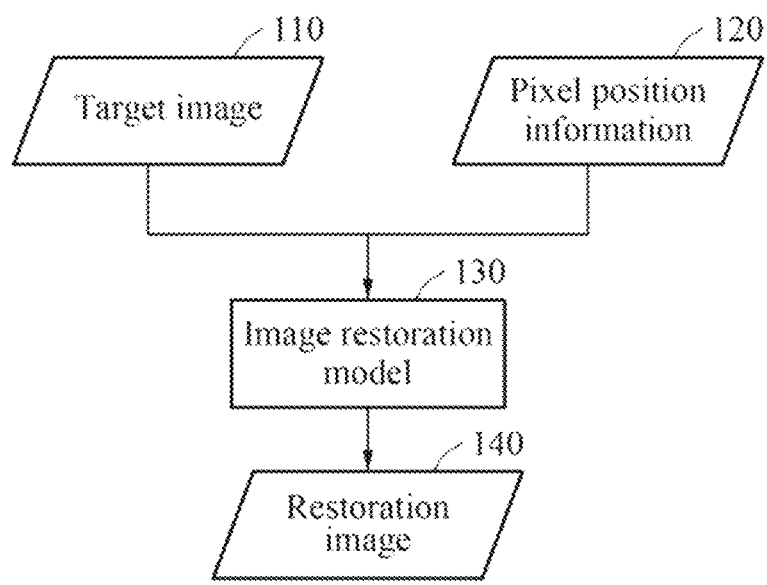
FIG. 1A is a diagram illustrating an image restoration model according to an example embodiment.

Example embodiments will be described in detail with reference in the accompanying drawings, wherein like reference numerals refer to the like elements throughout.

The following structural or functional descriptions are examples to merely describe the example embodiments, and the scope of the example embodiments are not limited to the descriptions provided in the present specification. Various changes and modifications can be made thereto by those of ordinary skill in the art.

Although terms of "first" or "second" are used to explain various components, the components are not limited to the terms. These terms are used only to distinguish one component from another component. For example, a "first" component may be referred to as a "second" component, or similarly, the "second" component may be referred to as the "first" component within the scope of the right according to the concept of the present disclosure.

It should be noted that if the specification describes that one component is "connected," "coupled," or "joined" to another component, a third component may be "connected," "coupled," and "joined" between the first and second components, although the first component may be directly connected, coupled or joined to the second component.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings.

FIG. 1A is a diagram illustrating an image restoration model according to an example embodiment.

Referring to FIG. 1A, an image restoration model 130 may output a restoration image 140 based on pixel position information 120 in response to an input of a target image 110. The target image 110 may refer to an image input to the image restoration model 130, and may be an image that includes different levels of degradation based on a pixel position. A degradation may be caused by an aberration of a lens used to capture the target image 110. A lens may be a multi-lens array or a single lens, which will be further described below with reference to FIGS. 1B and 1C. The restoration image 140 may refer to an image in which a degradation of the target image 110 is reduced, and may be output from the image restoration model 130.

The image restoration model 130 may perform an image processing of the input target image 110 and may output the restoration image 140. The image processing may include, for example, a super resolution (SR), deblurring, denoising, demosaicing, or inpainting. The SR may be an image processing to increase a resolution of an image, the deblurring may be an image processing to remove a blur included in an image, the denoising may be an image processing to cancel noise included in an image, demosaicing may be an image processing to reconstruct a full color image from incomplete color samples, and the inpainting may be an image processing to reconstruct a lost or damaged part of an image.

The pixel position information 120 may be based on at least one image representing a pixel position in the target image 110 based on two-dimensional (2D) coordinates. An image representing the pixel position information 120 may have the same resolution as that of the target image 110, and accordingly may indicate positions of pixels included in the target image 110, which will be further described below with reference to FIGS. 4 and 5.

Figure 1B:
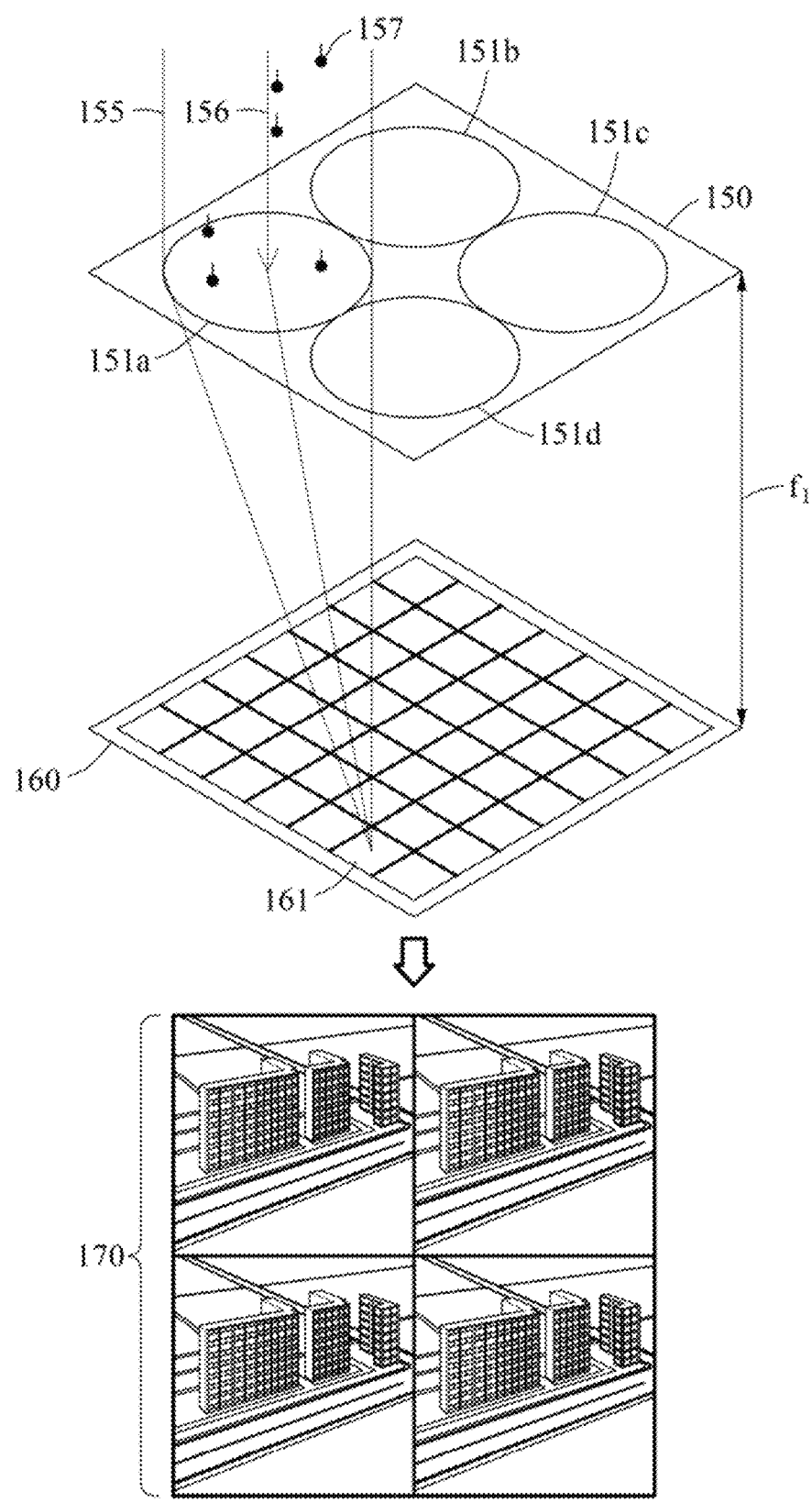
FIGS. 1B and 1C are diagrams illustrating lenses used to capture a target image according to an example embodiment.
Figure 1C:
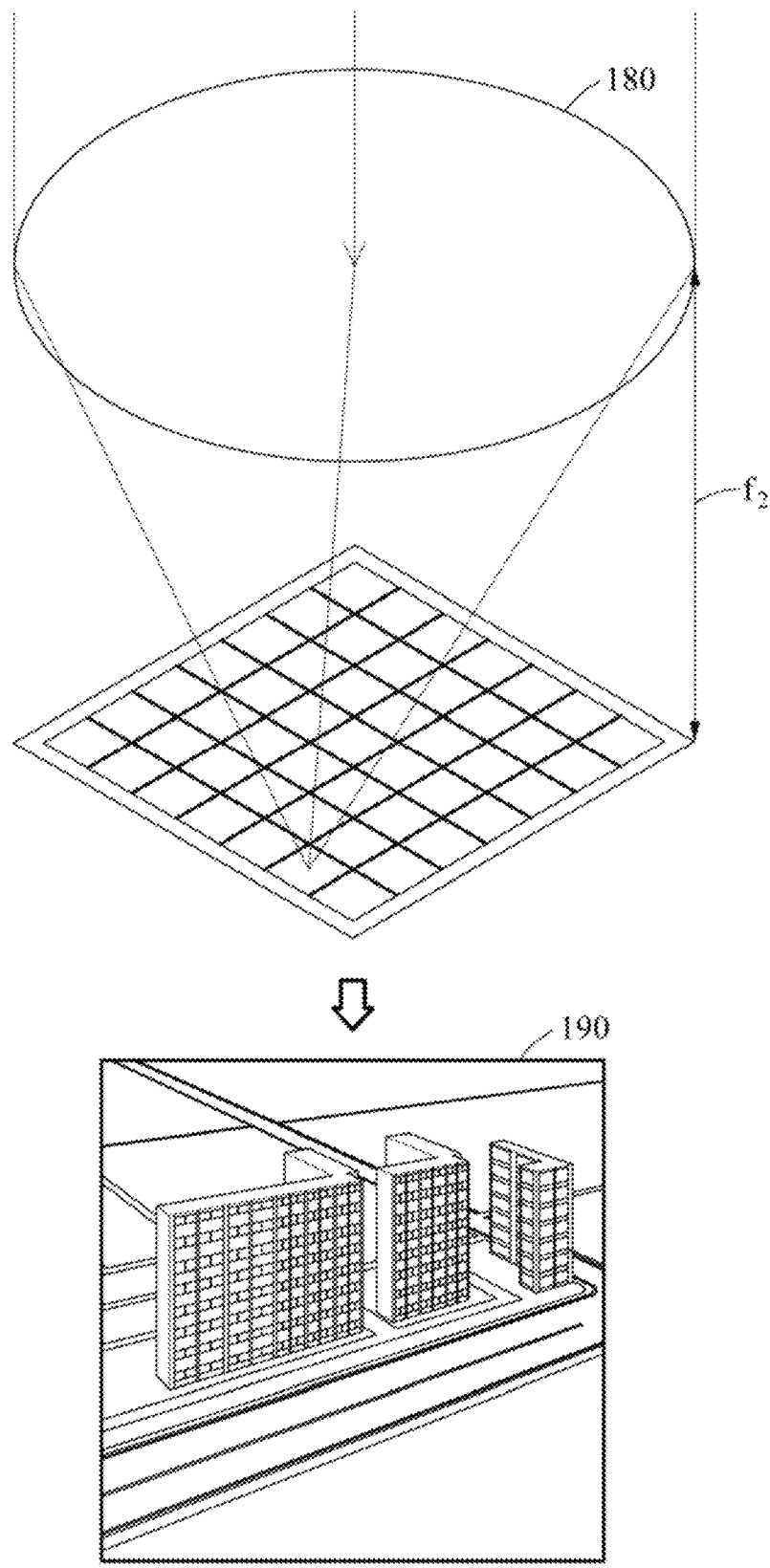

FIGS. 1B and 1C are diagrams illustrating lenses used to capture a target image according to an example embodiment.

Referring to FIG. 1B, a plurality of target images may be captured based on a multi-lens array 150.

The multi-lens array 150 may include a plurality of lens elements 151a, 151b, 151c and 151d. When a size of each of the lens elements included in the multi-lens array 150 decreases, a focal length $f_1$ of each lens element (i.e., lens element 151a) and a thickness of an image capturing apparatus may be reduced. That is, when a number of lens elements included in a same area increases, a focal length $f_1$ of a lens element 151a and a thickness of an image capturing apparatus may be reduced. As described above, by reducing a size of each of the lens elements included in the multi-lens array 150, a thin camera may be implemented. In another example, the lens element 151a may also be implemented in a multilayer structure.

An individual lens element 151a of the multi-lens array 150 may cover a region of a sensor 160 corresponding to a size of the individual lens element 151a. The region of the sensor 160 may be predetermined. For example, light 155 passing through the individual lens element 151 may be incident on sensing elements included in the region of the sensor 160. The light 155 may include a plurality of rays. A ray 156 may correspond to a flow of a photon 157. Each of sensing elements included in the sensor 160 may generate sensing information based on rays 156 passing through lens elements of the multi-lens array 150. For example, a sensing element 161 may generate sensing information based on a ray 156 incident on the lens element 151a. Also, light passing through another individual lens element 151b, other than the light 155 depicted by ray 156, may be incident on a portion of the sensing elements.

Rays passing through the plurality of lens elements may be sensed, and a compound eye vision (CEV) image 170 may be acquired as a target image. The CEV image 170 may refer to an image acquired by overlappingly capturing the same scene with a slightly different viewpoint, in a manner similar to an operation of compound eyes of an insect. For example, the CEV image 170 may be acquired based on intensities of rays received by the plurality of sensing elements through the plurality of lens elements arranged in an array. Images included in the CEV image 170 may respectively correspond to the plurality of lens elements.

The CEV image 170 may be input as a target image to an image restoration model, and pixel position information of individual images included in the CEV image 170, together with the CEV image 170, may be input to the image restoration model. The individual images included in the CEV image 170 may have the same resolution, and the pixel position information may also be input as a single frame having the same resolution as those of the individual images included in the CEV image 170 to the image restoration model. The image restoration model may determine a restoration image with a high resolution from the input CEV image 170 with a low resolution.

Referring to FIG. 1C, at least one target image 190 may be captured based on a single lens 180. The target image 190 may be captured based on the single lens 180. While the single lens 180 may have a size greater than that of each of the individual lens element 151 included in the multi-lens array 150 of FIG. 1B and may have a relatively long focal length $f_2$ based on the size, a volume of an image capturing apparatus may also increase. When capturing is performed once using the single lens 180, a single target image, that is, the target image 190 may be acquired. When the same scene is continuously captured several times, a plurality of target images may be acquired. The plurality of acquired target images, together with pixel position information, may be input to an image restoration model.

Figure 2:
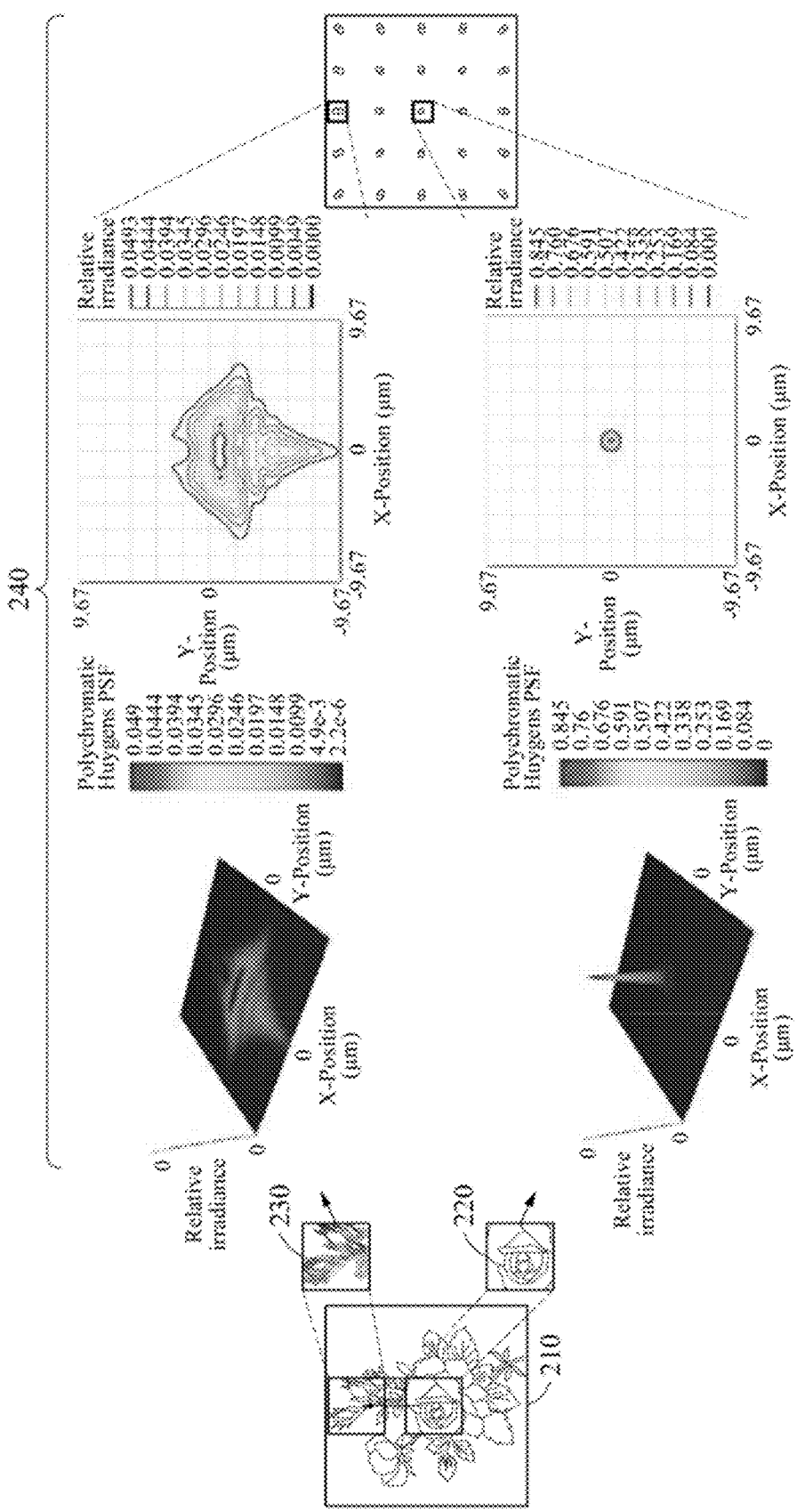
FIG. 2 is a diagram illustrating a degradation of a target image according to an example embodiment.

FIG. 2 is a diagram illustrating a degradation of a target image according to an example embodiment.

Referring to FIG. 2, a target image 210 includes different levels of degradation based on a pixel position. For convenience of description, the target image 210 may refer to an individual image included in a CEV image captured by a multi-lens array or a single image captured by a single lens, and a degradation characteristic is described based on a central portion 220 and a peripheral portion 230 of the target image 210. As shown in FIG. 2, a stronger degradation may appear in the peripheral portion 230 than in the central portion 220, which may be caused by an increase in a degree of degradation from a central portion of an image to an outer portion of the image due to a lens aberration. The above degradation characteristic may also be verified in a point spread function (PSF) 240. In the PSF 240, concentrating at one point in the central portion 220 rather than the peripheral portion 230 is performed. Thus, a first portion closer to the central portion 220 of the target image 210 has a weaker degradation than a second portion further from the central portion. Moreover, the degradation may have a symmetric shape, for example, an axial symmetry, based on a center of a lens.

Figure 3:
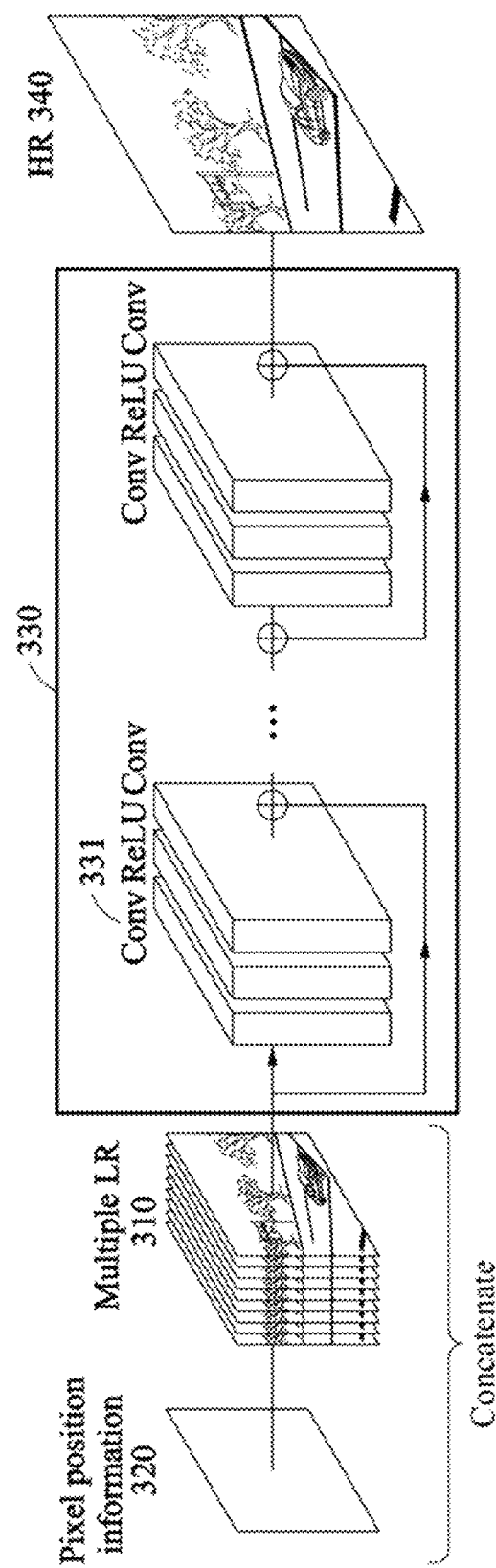
FIG. 3 is a diagram illustrating an operation of an image restoration apparatus according to an example embodiment.

FIG. 3 is a diagram illustrating an operation of an image restoration apparatus according to an example embodiment.

FIG. 3 illustrates an example of a process by which the image restoration apparatus acquires a restoration image 340 from an image restoration model 330 to which a target image 310 and pixel position information 320 of the target image 310 are input.

The target image 310 may refer to at least one image with different levels of degradation based on a pixel position, and may be, for example, a plurality of low-resolution (LR) images. The plurality of LR images may be a plurality of individual images included in a CEV image captured by a multi-lens array, or images acquired by continuously capturing the same scene several times using a single lens. Information included in a captured image may slightly change due to a line movement of an image sensor even though the same scene is continuously and quickly captured using the single lens, and a single high-resolution (HR) image may be obtained by combining the above variety of information. Even when the same information is included in the plurality of LR images, an image in which noise in the LR images is reduced may be obtained by averaging the information of the LR images.

The pixel position information 320 may include information of positions of pixels included in the target image 310. The pixel position information 320 will be further described below with reference to FIGS. 4 and 5.

The target image 310 and the pixel position information 320 may be concatenated to each other and may be input to the image restoration model 330. The image restoration model 330 may be a neural network that processes an input image using at least one convolution layer. The above-described target image 310 and pixel position information 320 may be concatenated to each other and may be input to a convolution layer 331 included in the image restoration model 330. When the pixel position information 320 indicating a position of each of pixels in an image is input together with the target image 310 to the image restoration model 330, the image restoration model 330 may apply an image restoration function suitable for a pixel to be restored by utilizing position information of the pixel. Thus, it is possible to effectively enhance a restoration performance.

The neural network may correspond to an example of a deep neural network (DNN). The DNN may include, for example, a fully connected network, a deep convolutional network or a recurrent neural network (RNN). The neural network may perform an image restoration by mapping, based on deep learning, input data and output data that are in a non-linear relationship. The deep learning refers to a machine learning scheme to solve a problem such as an image restoration from a big data set. Through supervised or unsupervised learning in the deep learning, input data and output data may be mapped to each other.

The neural network may include an input layer, a hidden layer and an output layer. Each of the input layer, the hidden layer and the output layer may include a plurality of nodes.

According to an example embodiment, nodes of layers other than the output layer in the neural network may be connected to nodes of a next layer via links to transmit output signals. A number of links may correspond to a number of nodes included in the next layer. The layers other than the output layer may be the input layer and a plurality of hidden layers.

According to an example embodiment, an output of an activation function associated with weighted inputs of nodes included in a previous layer may be input to each of nodes included in the hidden layer. The weighted inputs may be obtained by multiplying a weight to inputs of the nodes included in the previous layer. The weight may be referred to as a parameter of the neural network. For example, the weight may correspond to a kernel element included in a kernel matrix in a convolution layer. The activation function may include, for example, a sigmoid function, a hyperbolic tangent (tan h) function, or a rectified linear unit (ReLU) function. A nonlinearity may be formed in the neural network by the activation function. To each of nodes included in the output layer, weighted inputs of nodes included in a previous layer may be input.

When a width and a depth of the neural network are sufficiently large, the neural network may have a capacity large enough to implement an arbitrary function. When the neural network learns a sufficiently large quantity of training data through an appropriate learning process, an optimal image restoration performance may be achieved.

The image restoration model 330 may output the restoration image 340 in response to inputs of the target image 310 and the pixel position information 320. The restoration image 340 may refer to an image in which a degradation included in the target image 310 is reduced or removed, and may include, for example, an HR image.

Figure 4:
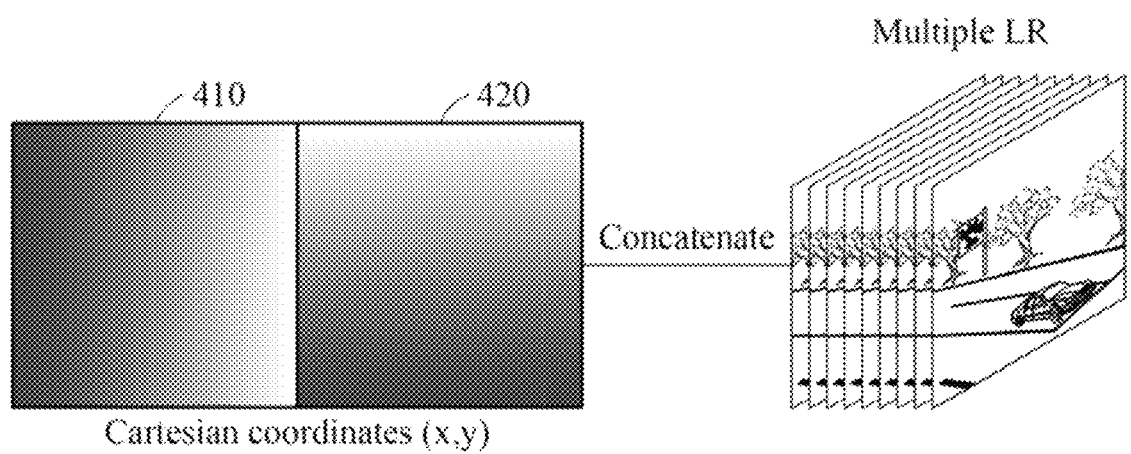
FIGS. 4 and 5 are diagrams illustrating pixel position information according to an example embodiment.
Figure 5:
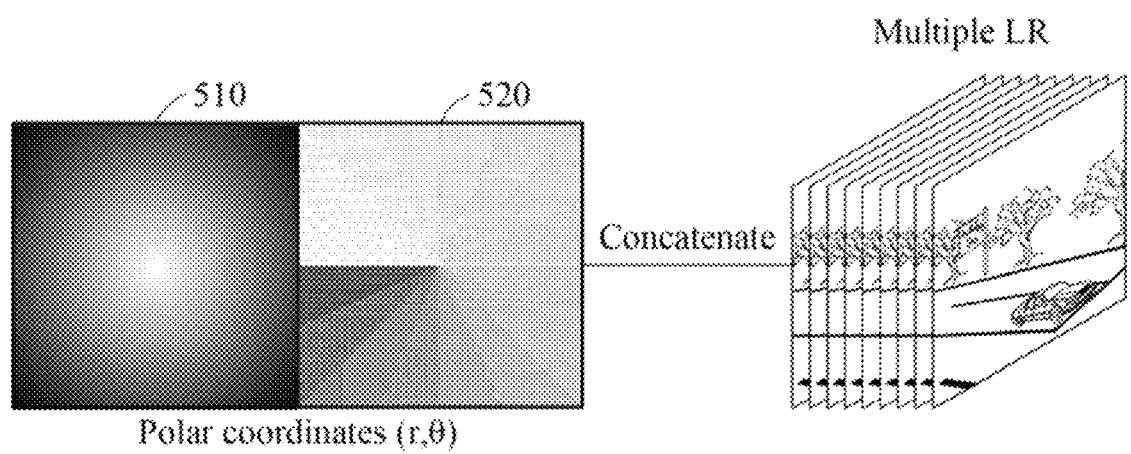

FIGS. 4 and 5 are diagrams illustrating pixel position information according to an example embodiment.

FIG. 4 illustrates pixel position information that indicates a position of a pixel included in a target image based on Cartesian coordinates.

The pixel position information may include a first image 410 of which a value changes in one axis direction in Cartesian coordinates, and a second image 420 of which a value changes in another axis direction perpendicular to the one axis direction. The first image 410 and the second image 420 may have the same resolution as that of the target image. For example, the first image 410 may be an image having a value changing in an x-axis direction despite having the same value in a y-axis direction, and the second image 420 may be an image having a value changing in the y-axis direction despite having the same value in the x-axis direction. An image restoration model may verify an x-axis value of a corresponding pixel position from the first image 410, may verify a y-axis value of a corresponding pixel position from the second image 420, and may utilize a corresponding pixel position (x, y) during an image restoration.

FIG. 5 illustrates pixel position information that indicates a position of a pixel included in a target image based on polar coordinates.

The pixel position information may include a third image 510 of which a value changes based on a distance from a reference point in polar coordinates, and a fourth image 520 of which a value changes based on an angle with respect to a reference line. The third image 510 and the fourth image 520 may have the same resolution as that of the target image. The third image 510 may be an image of which a value changes in response to a change in the distance from the reference point but that has the same value despite a change in the angle with respect to the reference line when distances from the reference point are identical. For example, the third image 510 may have a lowest value at the reference point and a highest value at four vertices of the third image 510 that are farthest from the reference point. Also, the fourth image 520 may be an image of which a value changes in response to a change in the angle with respect to the reference line but that has the same value despite a change in the distance from the reference point when angles with respect to the reference line are identical. For example, the fourth image 520 may have a lowest value in the reference line and a highest value at a largest angle in a predetermined direction (for example, clockwise or counterclockwise) with respect to the reference line. Although an angle with respect to the reference line is divided into "16" as shown in FIG. 5 for convenience of description, example embodiments are not limited thereto. For example, the angle with respect to the reference line may be divided into "n", and n may be a natural number greater than or equal to "1". An image restoration model may verify a distance r between a corresponding pixel and a reference point from the third image 510, may verify an angle θ with respect to a reference line of the corresponding pixel from the fourth image 520, and may utilize a position (r, θ) of the corresponding pixel during an image restoration.

In this example, the reference point may be a principal point of a lens that captures a target image. The principal point may be a point at which an optical axis and a principal plane of a lens intersect each other, and may refer to a center of the lens. The principal point may refer to an optical center of a lens and may differ from a geometric center of the lens. In another example, the reference point may be a center of the target image. Depending on example embodiments, when a principal point of a lens is not verified, the center of the target image may be set as a reference point.

In an example, pixel position information input to the image restoration model may be based on 2D coordinates determined based on, for example, the image restoration model or the target image. In an example, when an image restoration model removes a blur included in a target image, pixel position information based on polar coordinates, instead of Cartesian coordinates, may be selected and input to the image restoration model, because blur caused by a lens is generally radially distributed from a center of the lens. In another example, when a degradation included in a target image changes vertically and/or horizontally, when only a central portion of an image captured by an image sensor is cropped and is input as a target image to an image restoration model, pixel position information based on Cartesian coordinates, instead of polar coordinates, may be more useful for an image restoration.

In another example, pixel position information may include images indicating positions of pixels in a target image based on Cartesian coordinates, and images indicating the positions of the pixels in the target image based on polar coordinates. In this example, the pixel position information may include the first image 410 and the second image 420 of FIG. 4 and the third image 510 and the fourth image 520 of FIG. 5, and an image restoration model may perform an image restoration based on pixel position information that is based on Cartesian coordinates and/or polar coordinates, depending on a degradation of a target image to be restored.

Figure 6:
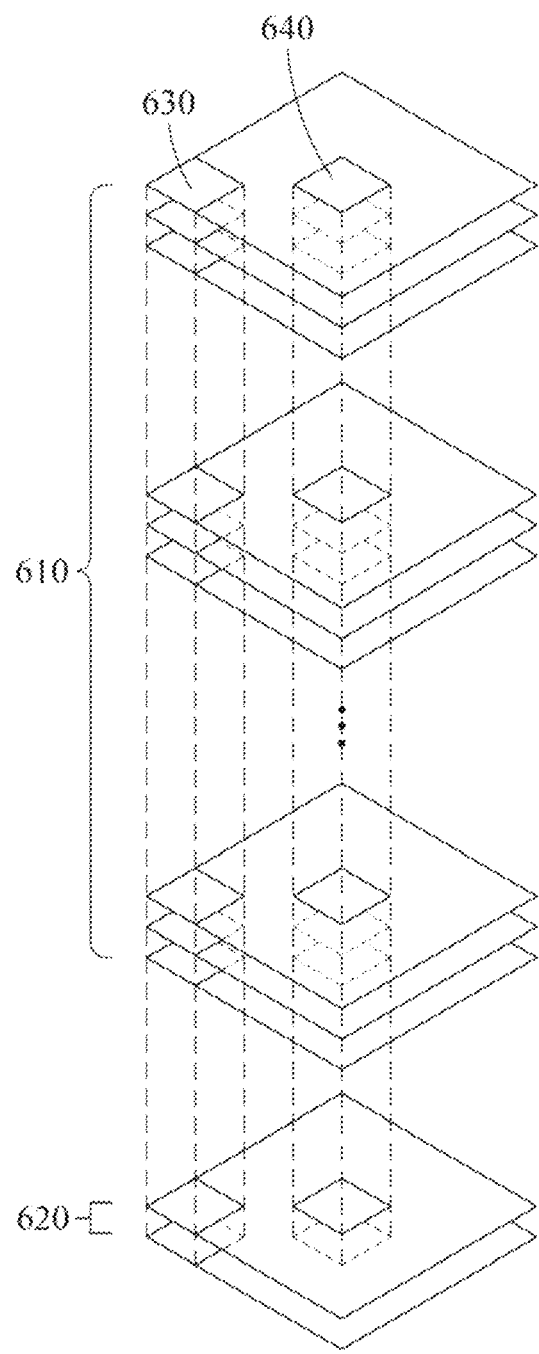
FIG. 6 is a diagram illustrating a process in which pixel position information and a target image are input to a convolution layer according to an example embodiment.

FIG. 6 is a diagram illustrating a process in which pixel position information and a target image are input to a convolution layer according to an example embodiment.

FIG. 6 illustrates a target image 610 and pixel position information 620 that are concatenated to each other.

The target image 610 may include a plurality of LR images, and each of the LR images may include three feature images, for example, an R image, a G image and a B image. The target image 610 may include, for example, a plurality of individual images included in a CEV image captured by a multi-lens array, or a single image captured by a single lens. The pixel position information 620 may include two images indicting pixel positions in the target image 610 based on 2D coordinates, as described above.

The target image 610 and the pixel position information 620 may be concatenated to each other and may be input to a convolution layer of an image restoration model. Two position information images and a plurality of LR images corresponding to each region may be input together to the convolution layer. For example, two position information images and a plurality of feature images corresponding to a peripheral portion 630 may be input together to the convolution layer, and the two position information images and a plurality of feature images corresponding to a central portion 640 may be input together to the convolution layer, and thus an optimal image restoration function may be applied to each region based on a position of a corresponding region when an image processing is performed in the image restoration model, to expect a more effective image restoration. The image restoration function may refer to at least one operation applied to the target image 610 in the image restoration model to acquire a restoration image, and an image restoration function applied to a corresponding region may vary depending on a position of a region in the target image 610. For example, different levels of degradation may appear in the peripheral portion 630 and the central portion 640 of the target image 610, and accordingly different image restoration functions may be applied to the peripheral portion 630 and the central portion 640. At least one operation may be an operation applicable to the image restoration model, and may include, for example, a convolutional operation, a ReLU operation, or a pooling operation.

The image restoration model to reduce different levels of degradation for each pixel region using the above image restoration function may be determined in advance through machine learning. The image restoration model may be a model trained in advance to output a reference restoration image with a reduced degradation in response to inputs of a reference target image with different levels of degradation based on a pixel position and reference pixel position information of the reference target image. The reference target image used during training may include a degradation caused based on a characteristic of a lens that captures a target image to be actually restored, and may have the same resolution as that of the target image to be actually restored. Also, the reference pixel position information used during training may be identical to pixel position information used for an actual image restoration.

As described above, the reference target image, the reference pixel position information and the reference restoration image may be used as training data, and the image restoration model may be trained even though blur information based on a lens design is absent.

Different levels of degradation based on the pixel position may occur for each lens that captures a target image, and a size, for example, a size of pixel position information, of data input to the image restoration model may change based on a resolution of the target image, and thus the image restoration model may be separately trained based on a lens that captures the target image and the resolution of the target image. For example, an image restoration model to remove a degradation of a target image captured by a smartphone camera and an image restoration model to remove a degradation of a target image captured by a general camera may be models trained based on different pieces of training data, and may be distinguished from each other.

Figure 7:
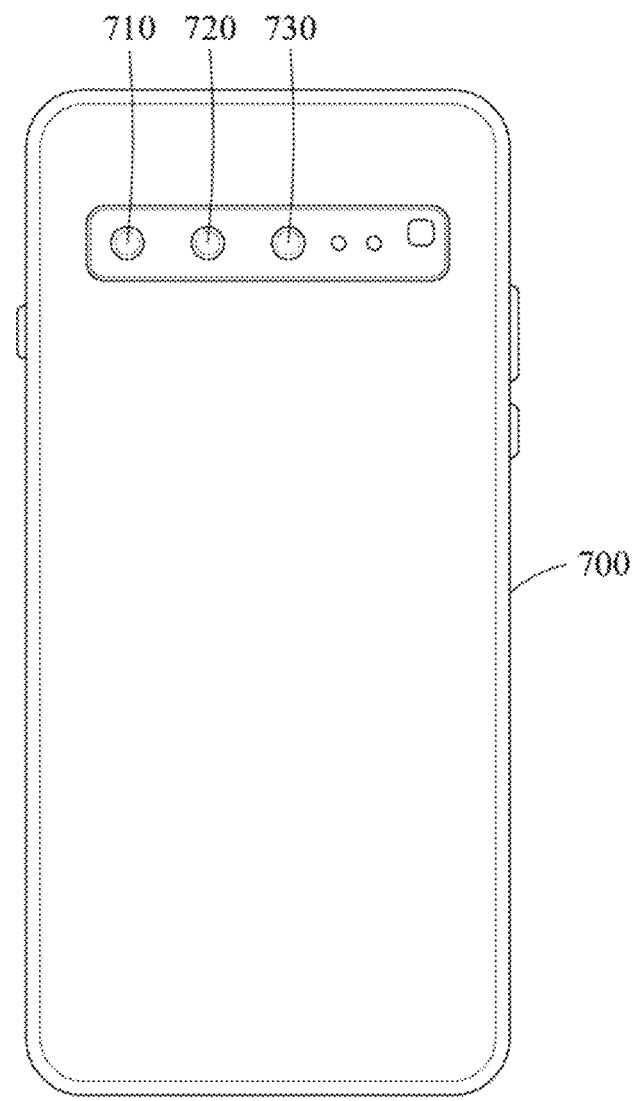
FIG. 7 is a diagram illustrating an apparatus capable of implementing an image restoration apparatus according to an example embodiment.

FIG. 7 is a diagram illustrating an apparatus capable of implementing an image restoration apparatus according to an example embodiment.

An image restoration apparatus may be applied to a removal of a degradation of an image captured by various devices. Also, the image restoration apparatus may be applied to use an image that does not include a degradation in various technical fields, for example, an object recognition, a style transfer or an unsupervised image generation.

For example, as shown in FIG. 7, an image restoration apparatus may be mounted in a mobile device 700 to restore an image captured by a camera in the mobile device 700. Although three cameras 710, 720 and 730 are mounted for convenience of description as shown in FIG. 7, various numbers of cameras may be included in the mobile device 700. The cameras 710, 720 and 730 may be different cameras, and have different lens specifications, for example, wide-angle lenses, standard lenses, telephoto lenses or multiple lenses, or have different resolutions. The image restoration apparatus may use three image restoration models to remove a degradation of an image captured by each of the cameras 710, 720 and 730. In an example, a single image restoration model may be trained through multi-task learning to remove a degradation of an image captured by each of the cameras 710, 720 and 730. In this example, information indicating which one of the cameras 710, 720 and 730 captures a target image to be restored may be additionally input to the image restoration model.

Figure 8:
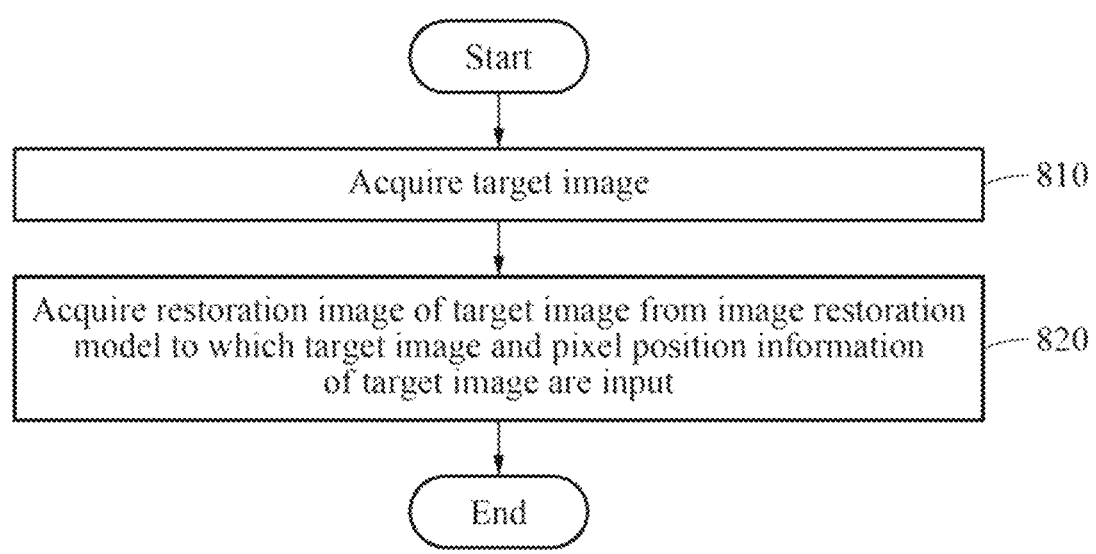
FIG. 8 is a flowchart illustrating an image restoration method according to an example embodiment.

FIG. 8 is a flowchart illustrating an image restoration method according to an example embodiment.

FIG. 8 illustrates an image restoration method performed by a processor included in an image restoration apparatus according to an example embodiment.

In operation 810, the image restoration apparatus acquires a target image. For example, the image restoration apparatus may acquire, as a target image, a plurality of individual images included in a CEV image captured by a multi-lens array, or a single image captured by a single lens. Pixel position information may indicate a pixel position in a target image based on 2D coordinates. In an example, the pixel position information may include a first image of which a value changes in one axis direction in Cartesian coordinates and a second image of which a value changes in another axis direction perpendicular to the one axis direction, and the first image and the second image may have the same resolution as that of the target image. In another example, the pixel position information may include a third image of which a value changes based on a distance from a reference point in polar coordinates and a fourth image of which a value changes based on an angle with respect to a reference line, and the third image and the fourth image have the same resolution as that of the target image. In another example, the pixel position information may include a first image of which a value changes in one axis direction in Cartesian coordinates, a second image of which a value changes in another axis direction perpendicular to the one axis direction, a third image of which a value changes based on a distance from a reference point in polar coordinates, and a fourth image of which a value changes based on an angle with respect to a reference line.

In operation 820, the image restoration apparatus acquires a restoration image of the target image from an image restoration model to which the target image and pixel position information of the target image are input. The pixel position information and the target image may be concatenated to each other and input to a convolution layer of the image restoration model. The target image may be an image with different levels of degradation based on a pixel position, and the restoration image may be an image in which the degradation is reduced.

The image restoration model may be a model trained to output a reference restoration image with a reduced degradation in response to inputs of a reference target image with different levels of degradation based on a pixel position and reference pixel position information of the reference target image.

Depending on example embodiments, when a target image corresponds to a plurality of individual images included in a CEV image captured by a multi-lens array, position information, identification information or arrangement information of a plurality of lens elements included in the multi-lens array may be additionally input to the image restoration model and may be used to determine a restoration image.

The plurality of lens elements included in the multi-lens array may have different degradation characteristics due to a process variation even though the lens elements are designed to have the same specifications. Position information of the plurality of lens elements is additionally provided to an image restoration model, and accordingly the restoration image may be determined further based on a difference in degradation characteristics between the plurality of lens elements. Also, since the plurality of lens elements included in the multi-lens array are arranged in different positions, different levels of degradation for the same object in an image may appear even though the image is obtained by capturing the same scene. Position information of the plurality of lens elements is additionally provided to the image restoration model, and thus the restoration image may also be determined further based on the above degradation difference.

The above description of FIGS. 1A through 7 is equally applicable to the method of FIG. 8, and thus further description thereof is not repeated herein.

Figure 9:
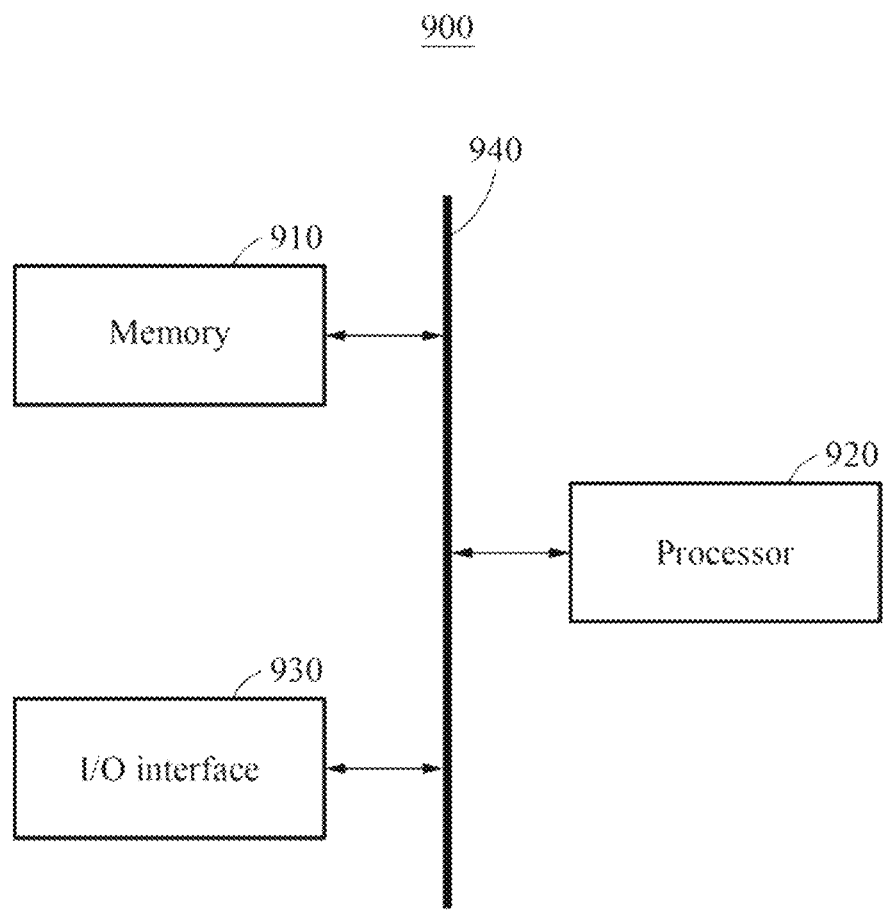
FIG. 9 is a diagram illustrating an image restoration apparatus according to an example embodiment.

FIG. 9 is a diagram illustrating an image restoration apparatus according to an example embodiment.

Referring to FIG. 9, an image restoration apparatus 900 includes a memory 910, a processor 920 and an input/output (I/O) interface 930. The memory 910, the processor 920 and the I/O interface 930 may communicate with each other via a bus 940.

The memory 910 may include a computer-readable instruction. The processor 920 may perform the above-described operations by executing an instruction stored in the memory 910. The memory 910 may include, for example, a volatile memory or a nonvolatile memory.

The processor 920 may be an apparatus configured to execute instructions or programs, or to control the image restoration apparatus 900, and may include, for example, a central processing unit (CPU) and/or a graphics processor unit (GPU). The image restoration apparatus 900 may be connected to an external device, for example, an image sensor or a database in which training data is stored, via the I/O interface 930, and may exchange data. For example, the image restoration apparatus 900 may receive an input vide through an external camera. The image restoration apparatus 900 may be implemented as a part of any one of various computing devices, for example, a smart home appliance, such as a smartphone, a wearable device, a personal digital assistant (PDA), a tablet computer, a laptop computer or a smart television (TV), a smart car, or a kiosk. In addition, the image restoration apparatus 900 may process the above-described operations.

According to example embodiments, when a convolution operation is performed in an image restoration model, information about a region of an image to be referred to may also be input to the image restoration model. Thus, a variable operation may be applied based on a region through a spatially variant image restoration function in a continuous space, to expect a relatively high restoration performance even for different levels of degradation depending on a pixel position.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image restoration method comprising:
    acquiring a target image including a plurality of individual images included in a Compound Eye Vision (CEV) image captured by a plurality of lens elements included in a multi-lens array of a camera;
    inputting the CEV image as the target image together with pixel position information of the plurality of individual images to an image restoration model; and
    obtaining a restoration image of the target image from the image restoration model based on the target image and the pixel position information,
    wherein the CEV image is acquired by overlapping capturing of a same scene with different viewpoints,
    wherein the CEV image that is acquired based on intensities of external rays received by a plurality of sensing elements after passing through the plurality of lens elements included in the multi-lens array of the camera, and
    wherein the pixel position information comprises a first image in which a first value changes based on a distance from a reference point in polar coordinates, the reference point being a principle point of a lens that captured the target image.

2. The image restoration method of claim 1, wherein the pixel position information comprises images representing pixel positions in the target image based on two-dimensional (2D) coordinates.

3. The image restoration method of claim 1, wherein
    the pixel position information comprises a first image, in which, a first value changes in a first axis direction in Cartesian coordinates, and a second image, in which, a second value changes in a second axis direction perpendicular to the first axis direction, and
    the first image and the second image have a same resolution as the target image.

4. The image restoration method of claim 1, wherein
    the pixel position information comprises a third image, in which, a third value changes based on a distance from a reference point in polar coordinates, and a fourth image, in which, a fourth value changes based on an angle with respect to a reference line, and
    the third image and the fourth image have a same resolution as the target image.

5. The image restoration method of claim 4, wherein the reference point is a principle point of a lens that captures the target image, or a central point of the target image.

6. The image restoration method of claim 1, wherein
    the pixel position information comprises a first image, in which, a first value changes in a first axis direction in Cartesian coordinates, a second image, in which, a second value changes in a second axis direction perpendicular to the first axis direction, a third image, in which, a third value changes based on a distance from a reference point in polar coordinates, and a fourth image, in which, a fourth value changes based on an angle with respect to a reference line, and
    the first image, the second image, the third image and the fourth image have a same resolution as the target image.

7. The image restoration method of claim 1, wherein the pixel position information and the target image are concatenated with each other and input to the image restoration model.

8. The image restoration method of claim 1, wherein the pixel position information and a pixel value of the target image are input to a convolution layer of the image restoration model.

9. The image restoration method of claim 1, wherein the target image includes different levels of degradation based on a pixel position.

10. The image restoration method of claim 9, wherein the degradation is caused by an aberration of a lens used to capture the target image.

11. The image restoration method of claim 1, wherein
    the target image comprises at least one low-resolution (LR) image with different levels of degradation based on a pixel position, and
    the restoration image is a high-resolution (HR) image in which the degradation is reduced with respect to the at least one LR image.

12. The image restoration method of claim 1, wherein the image restoration model is trained to output, in response to an input of a reference target image with different levels of degradation, a reference restoration image with a reduced degradation with respect to the reference target image based on a pixel position and reference pixel position information of the reference target image.

13. A non-transitory computer-readable storage medium storing instructions that, when executed by a processor, cause the processor to perform the image restoration method of claim 1.

14. A computer-implemented method of restoring an image in a trained neural network comprising:
   receiving a target image including a plurality of individual images included in a Compound Eye Vision (CEV) image captured by a plurality of lens elements included in a multi-lens array of a camera;
   receiving pixel position information of the plurality of individual images;
   applying one or more transformations to the target image based on the pixel position information in one or more layers of the trained neural network;
   creating a restoration image based on the one or more transformations applied to the target image; and
   outputting the restoration image,
   wherein the CEV image is acquired by overlapping capturing of a same scene with different viewpoints,
   wherein the CEV image that is acquired based on intensities of external rays received by a plurality of sensing elements after passing through the plurality of lens elements included in the multi-lens array of the camera, and
   wherein the pixel position information comprises a first image in which a first value changes based on a distance from a reference point in polar coordinates, the reference point being a principle point of a lens that captured the target image.

15. The computer-implemented method of claim 14, wherein
   the applying of the one or more transformations comprises applying the one or more transformations to the target image further based on position information of a lens element that captures each of the plurality of individual images.

16. An image restoration apparatus comprising:
   a memory storing one or more instructions; and
   at least one processor configured to execute the one or more instructions to:
   receive a target image including a plurality of individual images included in a Compound Eye Vision (CEV) image captured by a plurality of lens elements included in a multi-lens array of a camera;
   receive pixel position information of the plurality of individual images;
   apply one or more transformations to the target image based on the pixel position information in one or more layers of a trained neural network;
   create a restoration image based on the one or more transformations applied to the target image; and
   output the restoration image,
   wherein the CEV image is acquired by overlapping capturing of a same scene with different viewpoints,
   wherein the CEV image that is acquired based on intensities of external rays received by a plurality of sensing elements after passing through the plurality of lens elements included in the multi-lens array of the camera, and
   wherein the pixel position information comprises a first image in which a first value changes based on a distance from a reference point in polar coordinates, the reference point being a principle point of a lens that captured the target image.

17. The image restoration apparatus of claim 16, wherein the pixel position information comprises images representing pixel positions in the target image based on two-dimensional (2D) coordinates.

18. The image restoration apparatus of claim 16, wherein
   the pixel position information comprises a first image, in which, a first value changes in a first axis direction in Cartesian coordinates, and a second image, in which, a second value changes in a second axis direction perpendicular to the first axis direction, and
   the first image and the second image have a same resolution as the target image.

19. The image restoration apparatus of claim 16, wherein
   the pixel position information comprises a third image, in which, a third value changes based on a distance from a reference point in polar coordinates, and a fourth image, in which, a fourth value changes based on an angle with respect to a reference line, and
   the third image and the fourth image have a same resolution as the target image.

20. The image restoration apparatus of claim 16, wherein the pixel position information and the target image are concatenated with each other.

* * * * *